(12) United States Patent
Taha et al.

(10) Patent No.: US 8,266,329 B2
(45) Date of Patent: Sep. 11, 2012

(54) APPARATUS AND METHOD FOR ACCESSING COMMAND LINE INTERFACE INFORMATION FROM A DEVICE

(75) Inventors: Gaith Taha, Aylesbury (GB); James S. Hiscock, Gloucester, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 11/756,022

(22) Filed: May 31, 2007

(65) Prior Publication Data

US 2008/0005361 A1 Jan. 3, 2008

Related U.S. Application Data

(60) Provisional application No. 60/810,070, filed on Jun. 1, 2006.

(51) Int. Cl.
G06F 3/00 (2006.01)
G06F 13/28 (2006.01)
G06F 13/12 (2006.01)
G06F 13/38 (2006.01)

(52) U.S. Cl. .................. 710/5; 710/62; 710/24
(58) Field of Classification Search ................ 710/5, 24, 710/62
See application file for complete search history.

(56) References Cited

U.S. PATENT DOCUMENTS

| 5,694,559 | A | * | 12/1997 | Hobson et al. | 715/705 |
| 5,995,921 | A | * | 11/1999 | Richards et al. | 704/9 |
| 6,199,061 | B1 | * | 3/2001 | Blewett et al. | 707/3 |
| 6,462,757 | B1 | * | 10/2002 | Kao et al. | 715/783 |
| 2003/0004941 | A1 | * | 1/2003 | Yamada et al. | 707/3 |
| 2004/0078723 | A1 | * | 4/2004 | Gross et al. | 714/47 |
| 2004/0158621 | A1 | * | 8/2004 | Reyna | 709/220 |
| 2004/0249632 | A1 | * | 12/2004 | Chacon | 704/9 |

OTHER PUBLICATIONS

Linux and UNIX man command help, Mar. 19, 2005, http://web.archive.org/web/20050319040657/http://www.computerhope.com/unix/uman.htm.*
UNIX man pages: man(), Feb. 7, 2005, http://web.archive.org/web/20050207054027/http://unixhelp.ed.ac.uk/CGI/man-cgi?man.*
Hierarchy definition from dictionary.com, http://dictionary.reference.com/browse/hierarchy.*
"Unix Help", Apr. 20, 1999, http://web.archive.org/web/19990420081035/www.computerhope.com/unix.htm.*
"Unix help command help", Aug. 20, 2001, http://web.archive.org/web/20010828091331/www.computerhope.com/unix/uhelp.htm.*
"Viewing and searching the Linux man pages", Dec. 20, 2005, http://web.archive.org/web/20051220144054/http://www.tuxfiles.org/linuxhelp/manpages.html.*
"Terminal emulator—Wikipedia, the free encyclopedia", Mar. 23, 2006, http://web.archive.org/web/20051220105016/http://en.wikipedia.org/wiki/Terminal_emulator.*
EP Combined Search and Examination Report.
"UNIX man pages: man()", Feb. 18, 1995, available from http://unixhelp.ed.ac.uk/CGI/man-cgi?man and see also http://computerhope.com/unix/uman.htm.

* cited by examiner

Primary Examiner — Chun-Kuan Lee
Assistant Examiner — Farley Abad

(57) ABSTRACT

A method and apparatus for accessing information from a network device, said device being managed through a command line interface, said method comprising storing information regarding operation of the device in a hierarchical structure in a memory within the device, searching for a command line management feature or configuration by passing a search command to the device and then passing a command relating to the feature name or configuration to the device, whereby the device then searches through the hierarchical data structure for the feature name or configuration in which the search command is provided in the first layer of the hierarchical structure in the memory and the feature name or configuration is provided in the second layer of the hierarchical structure in the memory within the device.

20 Claims, 6 Drawing Sheets

| 1 FIRST LEVEL BRANCH SUBJECT | 2 BRIEF DESCRIPTION | 3 SECOND LEVEL BRANCH SUBJECT | 4 BRIEF DESCRIPTION | 5 | 6 ADDRESS OF RELEVANT INFORMATION | 7 BRIEF DESCRIPTION OF INFORMATION AT RELEVANT ADDRESS |
|---|---|---|---|---|---|---|
| schedule | Schedule system task | | | | | |
| search | Find features/configurations location | >>> feature | Find where to configure a certain feature | select "feature dhcp" | >>> system-view -> dhcp enable | dhcp service enable |
| | | | | | >>> system-view -> dhcp relay release | Release one ip address |
| | | | | | >>> system-view -> dhcp select | Setting process mode for dhcp packet |
| | | | | | >>> system-view -> dhcp select global | Global dhcp ip mode |
| | | | | | >>> system-view -> dhcp select interface | Interface dhcp ip pool mode |
| | | | | | >>> system-view -> dhcp select relay | Relay mode |
| | | | | | >>> system-view -> display dhcp client | dhcp client information |
| | | | | | >>> system-view -> display dhcp relay | dhcp relay information |
| | | | | | >>> system-view -> display dhcp server | dhcp server information |
| | | >>> configuration | Find a key word that has been configured | | | |
| send | Send information to other user terminal | | | | | |
| start-script | Start a scripting on a ui | | | | | |
| startup | Specify system startup parameters | | | | | |
| super | Privilege current user a specified priority | | | | | |
| system-view | Enter system view | | | | | |
| telnet | Establish one telnet connection | | | | | |
| terminal | Set the terminal line characteristics | | | | | |
| tftp | Open tftp connection | | | | | |
| tracert | Trace route function | | | | | |
| undelete | Recover a deleted file | | | | | |
| undo | Cancel current setting | | | | | |
| upgrade | Upgrade bootrom | | | | | |
| vrbd | Show vrp version | | | | | |
| xmodem | Establish an xmodem connection | | | | | |

Figure 2

| Command | Description |
|---|---|
| format | Form the device |
| free | Clear user terminal interface |
| ftp | Open FTP connection |
| lock | Lock current user terminal interface |
| mkdir | Create a new directory |
| more | Display the contents of file |
| move | Move a file |
| msdp-tracert | MSDP traceroute to source RP |
| mtracert | Trace route to multicast source |
| pad | Establish one PAD connection |
| ping | Send echo messages |
| pwd | Display current working directory |
| quit | Exist from current command viewfinder |
| reboot | Reboot system |
| rename | Rename a file or directory |
| reset | Reset Operation |
| rmdir | Remove an existing directory |
| rsh | Establish one RSH connection |
| save | Save current configuration |
| schedule | Schedule system task |
| search | Find features/configurations location |
| send | Send information to other user terminal interface |
| start-script | Start a script-string on a UI |
| startup | Specify system start-up parameters |
| super | Privilege current user a specified priority level |
| system-view | Enter system view |
| telnet | Establish one TELNET connection |
| terminal | Set the terminal line characteristics |
| tftp | Open TFTP connection |
| tracert | Trace route function |
| undelete | Recover a deleted file |
| undo | Cancel current setting |
| upgrade | Upgrade bootrom |
| vrbd | show VRP version |
| xmodem | Establish an x-modem connection |

```
<router-mid> search
[router-mid-search] ?
Feature
Configurations
[router-mid-search] feature dhcp
system-view -> DHCP enable                          DHCP service enable
system-view -> DHCP relay release                   Release one IP address
system-view -> DHCP select                          Setting process mode for DHCP packet
system-view -> DHCP select global                   Global DHCP IP mode
system-view -> DHCP select interface                Interface DHCP IP pool mode
system-view -> DHCP select relay                    Relay mode
system-view -> display DHCP client                  DHCP client information
system-view -> display DHCP relay                   DHCP relay information
system-view -> display DHCP server                  DHCP server information
[router-mid-search] configurations ?
[router-mid-search-configurations] Name dhcp global pool
Name
Parameter
Reason
[router-mid-search-configurations] Name dhcp global pool
DHCP Global Pool:

Network 10.161.63.0 mask 255.255.255.0

Full details: system-view - > display dhcp server tree all
[router-mid-search-configurations] parameter 10.161.63.0
DHCP Global Pool:

Network 10.161.63.0 mask 255.255.255.0

Full details: system-view - > display dhcp server tree all
[router-mid-search-configurations] reason 10.161.63.0
DHCP Global Pool:

Network 10.161.63.0 mask 255.255.255.0
Reason: "Use 255 private addresses for campus XYZ DHCP pool which is assigned
the 161.63 subgroup"

Full details: system-view - > display dhcp server tree all
[router-mid-search-configurations]
```

APPARATUS AND METHOD FOR ACCESSING COMMAND LINE INTERFACE INFORMATION FROM A DEVICE

BACKGROUND OF THE INVENTION

Network devices today can have many functions and parameters that can be managed through a textual user interface (e.g., a command line interface), which because of its complexity and syntax used increases the difficulty and training required to manage these devices.

The present invention relates to apparatus and method for accessing command line interface information from a device.

Devices such as routers, hub, switches or other devices in a network include information relating to that device, that is, details of its type, and the configuration and status of various parts of the device, which can be accessed by a network supervisor via the command line interface. Whilst information relating to how to set up a device, for example, how to configure the device, may be provided in the form of a booklet, it is often more convenient to access this information directly from the device itself. However in view of the large amount of information, it is difficult to access this information without being familiar with the layout of the information on a particular device and different manufacturers of the device tend to arrange the information in different ways so it is difficult to be fully skilled at accessing the relevant information.

It would also be useful for a network supervisor to be able to easily establish the existing values to which the various parameters of the device have been set and even more useful to be able to easily determine the reason for each parameter value.

The present invention relates to a method and apparatus for storing some or all of such information and for providing easy access to the information.

SUMMARY OF THE INVENTION

We will describe searching capabilities in devices that have textual user interfaces to enhance products usability, especially with products that contain an enormous number of features which increases the complexity; therefore, lack usability.

We will describe data storage organization and functions to help network supervisors to more easily find and learn about management functions and the commands to control these functions. Also, we will describe an arrangement that enables network supervisors to quickly and easily find which parameters were set to a specified parameter value and allows network supervisors to note and read back why that parameter was set to that value.

The present invention provides, according to a first aspect, a method for accessing information from a network device, said device being managed through a command line interface, said method comprising storing information regarding operation of the device in a hierarchical structure in a memory within the device, searching for a command line management feature or configuration by passing a search command to the device and then passing a command relating to the feature name or configuration to the device, whereby the device then searches through the hierarchical data structure for the feature name or configuration.

Preferably, the search command is provided in the first layer of the hierarchical structure in the memory and the feature name or configuration is provided in the second layer of the hierarchical structure in the memory within the device.

Preferably, the device provides a list of the commands that use the feature name, said device storing data relating to all of the features in a third layer of the hierarchical structure in the memory.

Preferably, the third layer includes, for each feature, the associated commands that use that feature name, a short description of each of the commands, and a list of similar terms.

Preferably, the method includes displaying the feature, commands and short description Preferably, the method includes searching for commands which use a particular parameter by further passing a command to the device after the command relating to the configuration whereby the device will search for all the commands that have the relevant parameter and will display a list of commands that have that parameter.

Preferably, the memory includes a field associated with each parameter including information as to why a parameter was set to a particular value, whereby the device will display information as to why each command parameter was set to a particular value.

The present invention provides, according to a second aspect, a network device, said device being managed through a command line interface, said device comprising a memory storing information regarding operation of the device in a hierarchical structure, means being provided to search for a command line management feature or configuration in the memory by receiving a search command to the device and then receiving a command relating to the feature name or configuration to the device, whereby the device then searches through the hierarchical data structure for the feature name or configuration The present invention provides, according to a third aspect, a method for accessing command line interface information from a device in a network, said device being managed through a command line interface, said method comprising storing information regarding operation of the device in a memory within the device, sending to the device a keyword relating to the subject to be searched, and said device providing a list of entries where information relating to the keyword is stored in the memory.

The present invention provides, according to a fourth aspect, a device in a network, said device being managed through a command line interface, said device including means for accessing information such as command line interface information from the device, said device including a memory storing information regarding operation of the device, means to operate access to the information in said memory whereby when a keyword relating to a subject to be searched is passed to said device, said device provides a list of information relating to the keyword.

Said device preferably provides said list in a readable format with a brief description of the subject stored at each entry.

Said information is preferably provided in a branch structure whereby, before said keyword is entered, a list of first-branch subjects stored in the memory is displayed and the user selects one of said first-branch subjects before entering said keyword.

BRIEF DESCRIPTION OF THE DRAWINGS

FIG. 2 is a chart which illustrates how the information in a device may be accessed according to the invention;

FIG. 3A is a screen shot relating to the arrangement of FIG. 2;

FIG. 3B is another screen shot relating to the arrangement of FIG. 2;

DETAILED DESCRIPTION OF THE PREFERRED EMBODIMENTS

Figure 1:
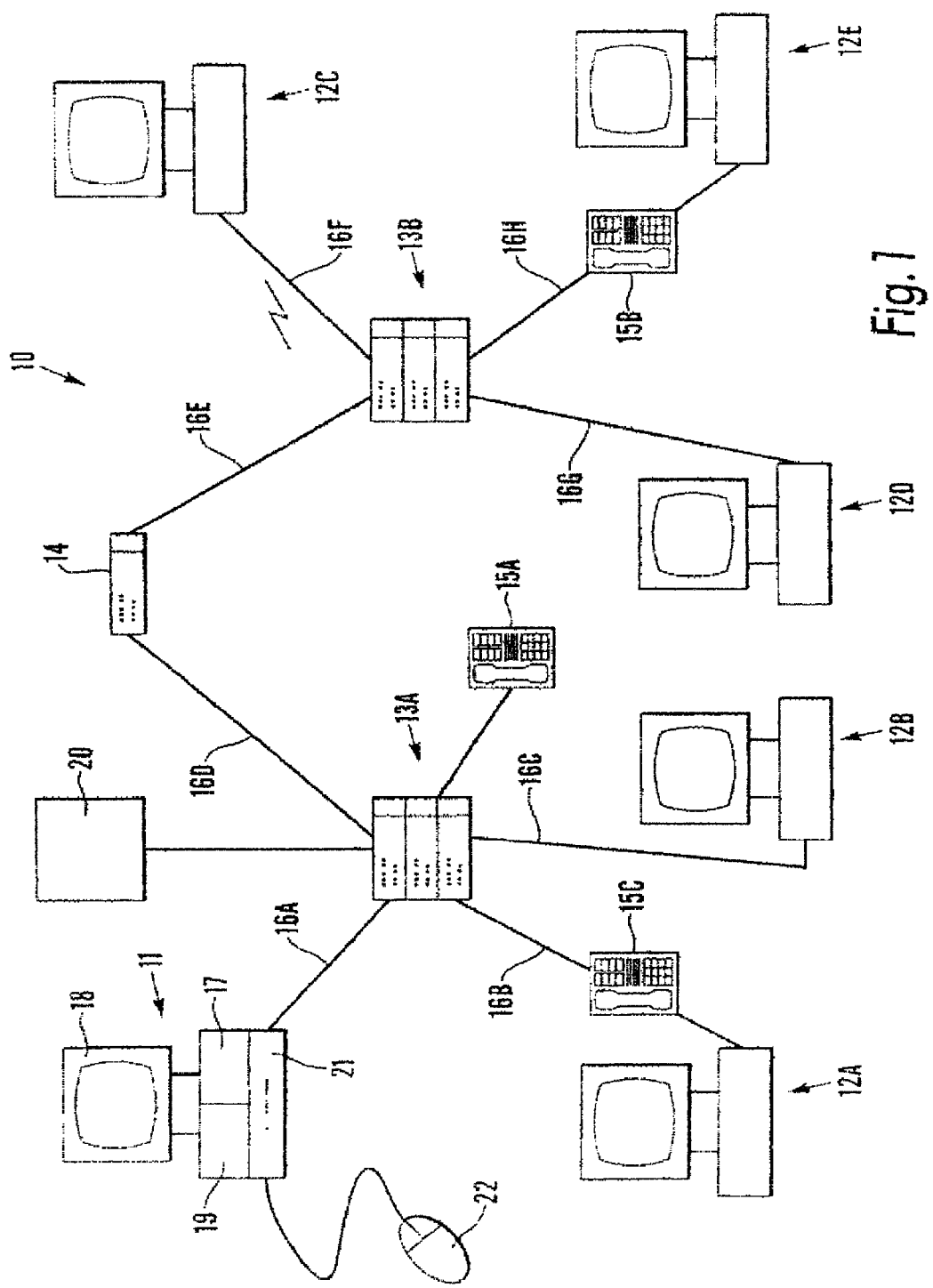
FIG. 1 is an arrangement of a network, which includes devices, which may include preferred embodiments of the invention.

Referring to FIG. 1 there is shown a physical network 10 comprising a plurality of devices in the form of a network supervisor's workstation or computer 11, other workstations 12B-E, hubs 13A, 13B, switch 14, Ethernet phones 15A-C, phone 15A being directly connected to hub 13A, and phone 15B being connected between hub 13B and workstation 12E and phone 15C between hub 13A and workstation and a network call processor (NCP) 20 which operates the telephones 15A-C over the network. The network is a simple network and is set out for purposes of illustration only. Other configurations and arrangements of network may be used.

The devices are connected together by means of links 16A-H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive, a zip drive or a flash memory, and a memory 17 for storing a program which may have been loaded from the program store 21 or downloaded for example via Internet from a website.

Let us assume that the huh 13A has been replaced and it is necessary for the network supervisor to configure it. The hub 13A includes a memory which includes information relating to that device, that is, details of its type, and the configuration and status of various parameters of the device, which can be accessed via the command line interface. It is more convenient to access this information directly from the device itself.

Commands that control the various functions of a device are grouped by function and view. Management functions are done within the context of these groupings, which provides a logical grouping of related commands and the various views restrict access to various functions. Within each of these command groups or view, there is a group of commands and for each command there may be one or more parameters.

Information about all the textual user interface commands is arranged within the memory of the device in a hierarchical manner in layers, which comprise branches, there being provided a plurality of branch levels. Thus the information held is divided into relevant broad subjects. As will be seen from FIG. 2, the broad subjects each have a title listed in column 1 and a related short description listed in column 2. We will refer to the subjects of column 1 as providing first branch subjects.

The first branch subjects and their corresponding brief descriptions are:

| | |
|---|---|
| format | Format the device |
| free | Clear user terminal interface |
| ftp | Open FTP connection |
| lock | Lock current user terminal interface |
| mkdir | Create a new directory |

-continued

| | |
|---|---|
| more | Display the contents of file |
| move | Move a file |
| msdp-tracert | MSDP traceroute to source RP |
| mtracert | Trace route to multicast source |
| pad | Establish one PAD connection |
| ping | Send echo messages |
| pwd | Display current working directory |
| quit | Exist from current command viewfinder |
| reboot | Reboot system |
| rename | Rename a file or directory |
| reset | Reset Operation |
| rmdir | Remove an existing directory |
| rsh | Establish one RSH connection |
| save | Save current configuration |
| schedule | Schedule system task |
| search | Find features/configurations location |
| send | Send information to other user terminal interface |
| start-script | Start a script-string on a UI |
| startup | Specify system start-up parameters |
| super | Privilege current user a specified priority level |
| system-view | Enter system view |
| telnet | Establish one TELNET connection |
| terminal | Set the terminal line characteristics |
| tftp | Open TFTP connection |
| tracert | Trace route function |
| undelete | Recover a deleted file |
| undo | Cancel current setting |
| upgrade | Upgrade bootrom |
| vrbd | Show VRP version |
| xmodem | Establish an x-modem connection |

One of these first level commands is "search", which finds management features or finds configuration parameters and values. The second level for the "search" command contains "feature" and "configurations" which specifies if the network supervisor is searching for information about a management feature or is searching for a configuration parameter name of a value that was assign to a configuration parameter.

Search for Command Line Management Feature

To search for a command line management feature of a particular device in the network, a network supervisor enters "search feature" (which passes a relevant search command to the chosen device) and then enters the feature name (which passes a relevant command to the chosen device). The chosen device then searches through its hierarchical data structure for entered feature name and for similar items. For this command the first layer is "search" the second layer is "feature" and the third layer is a list of features. Contained in this third layer for each feature in the list is the associated commands that use that feature name, a short description of each of the commands, and a list similar terms to aid a network supervisor to find the command if there are close to the feature name but did not enter the feature name exactly. The commands examples and descriptions which match or are close to the feature name entered in the "search feature" command are displayed to the network supervisor.

Search for Configuration Parameter Name or Value

If a network supervisor wants to know what commands use the parameter "speed", then the network supervisor will enter "search configurations speed" (which passes a relevant command to the chosen device) and the chosen device will search through its hierarchical data structure for all the commands that have a parameter called "speed" and will display on the network supervisor's workstation (or print out) the list of commands that have a parameter called "speed".

If a network supervisor wants to know what parameters have been set to the value of 10.161.63.0, then the network supervisor would enter "search configurations parameter 10.161.63.0", (which passes a relevant search command to the chosen device) and the chosen device will search through its hierarchical data structure for all the configuration parameters that have been set to the value of 10.161.63.0. The device would display on the network supervisor's workstation each parameter that has been set the value of 10.161.63.0 and for each parameter displayed the command used to set that parameter to a value will also be displayed, so the network supervisor will quickly know how to set that parameter to a different value if desired.

If a network supervisor wants to know why a parameter was set to a particular value (e.g., 10.161.63.0), then the network supervisor would enter "search configurations reason 10.1 61.63.0" (which passes a relevant search command to the chosen device) and the device will search through its hierarchical data structure for all the configuration parameters that have been set to the value of 10.161.63.0 and read the optional reason field associated with each parameter found. The device would display on the network supervisor's workstation each parameter that has been set the value of 10.161.63.0 and the reason field. When a parameter value is set the network supervisor is prompted to briefly describe why this parameter is being set the value. The reason field will help the network supervisor understand not only what value a parameter holds, but will also provide the rational for setting that parameter to that specific value.

As another more specific example, let us assume that a network supervisor wishes to search how to configure the device in relation to DHCP. Thus the network supervisor selects "search" from the first-level branch subject. Under "search" in column 3 are two second-level branch subjects, "feature" and "configuration". Column 4 sets out the corresponding brief descriptions, "Find where to configure a certain feature" and "Find a keyword that has been configured" Thus the first of these, "features" sets out where to configure a particular feature.

The network supervisor then selects "DHCP" as a key word, which then provides a list of the entries where the relevant information relating to the configuration of the device with respect to DHCP will be found. These are listed in column 6 as entries and brief titles and with corresponding brief descriptions in column 7, thus, referring now to FIG. 3B:—

| | |
|---|---|
| system-view -> DHCP enable | DHCP service enable |
| system-view -> DHCP relay release | Release one IP address |
| system-view -> DHCP select | Setting process mode for DHCP packet |
| system-view -> DHCP select global | Global DHCP IP mode |
| system-view -> DHCP select interface | Interface DHCP IP pool mode |
| system-view -> DHCP select relay | Relay mode |
| system-view -> display DHCP client | DHCP client information |
| system-view -> display DHCP relay | DHCP relay information |
| system-view -> display DHCP server [router-mid-search] | DHCP server information |

The network supervisor wishes to find configuration information and selects "configurations". The device lists the three possible commands used to find configuration information.
[router-mid-search] configurations
[router-mid-search-configurations]?
Name
Parameter
Reason
Full details: system-view->display dhcp server tree all
[ router-mid-search-configurations]
The network supervisor chooses the command "Name" to find configuration information about the parameter named "dhcp global poor". The device displays information indicating the dhcp global pool has been configured with a Network address of 10.161.63.0 and a subnet mask of 255.255.255.0.
[router-mid-search-configurations]Name dhcp global pool
DHCP Global Pool:
Network 10.161.63.0 mask 255.255.255.0
Full details: system-view->display dhcp server tree all
[router-mid-search-configurations]

The network supervisor then wishes to see all parameters set to the value of 10.161.63.0.
[router-mid-search-configurations] parameter 10.161.63.0
DHCP Global Pool:
Network 10.161.63.0 mask 255.255.255.0
Full details: system-view->display dhcp server tree all
[router-mid-search-configurations]

The network supervisor further inquires why the parameter was set to the value of 10.161.63.0.
[router-mid-search-configurations] reason 10.161.63.0
DHCP Global Pool:
Network 10.161.63.0 mask 255.255.255.0
Reason: "Use 255 private addresses for campus XYZ DHCP pool which is assigned the 161.63 subgroup"
Full details: system-view - >display dhcp server tree all
[router-mid-search-configurations]

Thus in a very simple manner the network supervisor can find the relevant information which can be displayed on the screen. The process can also be understood from a consideration of computer screen shot of FIGS. 3A.

Figure 4:
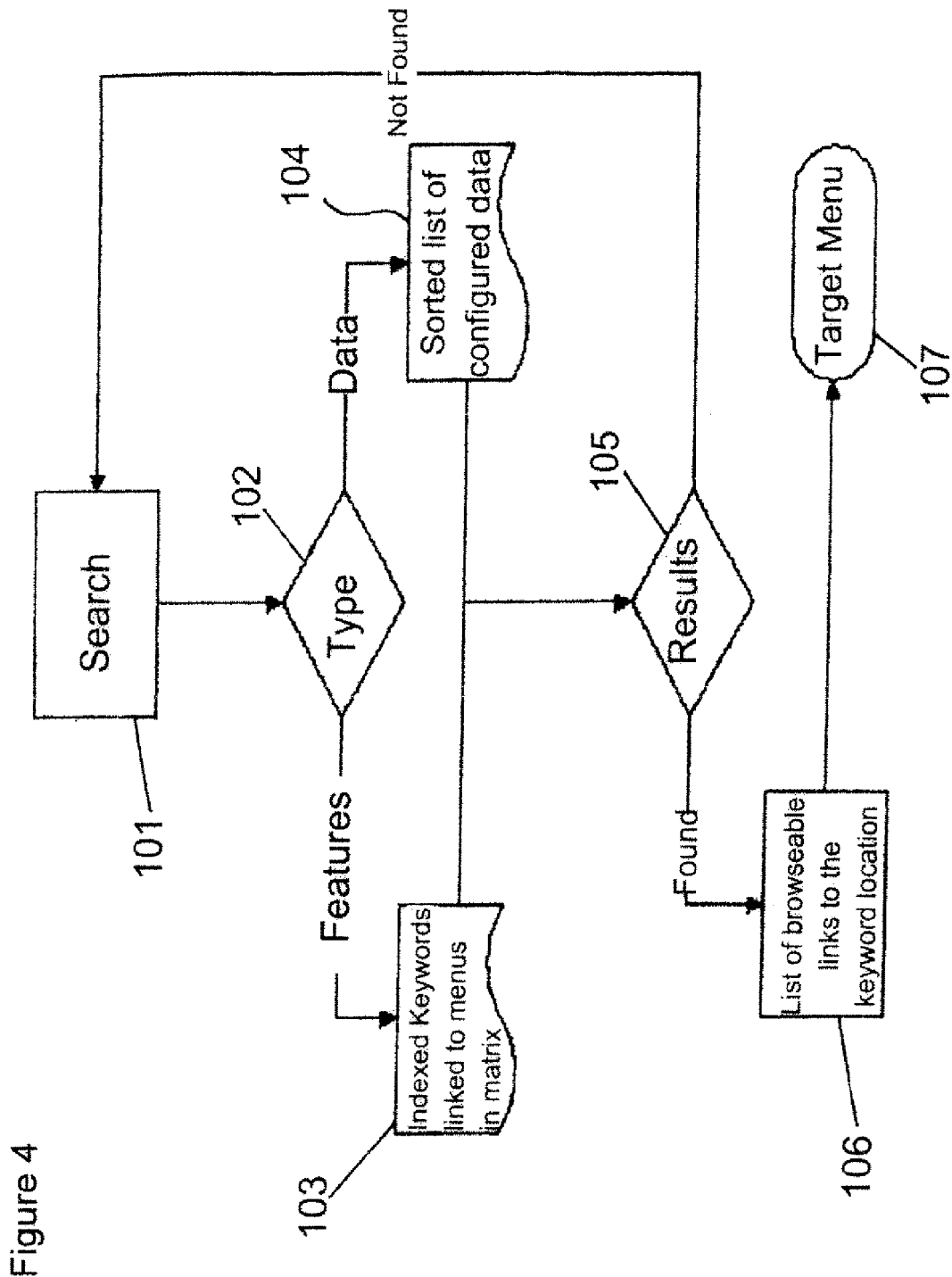
FIG. 4 is a flow chart of the steps of a method according to a preferred embodiment of the invention.

Referring to FIG. 4, the steps of a process for carrying out the invention in a preferred aspect are set out.

| | |
|---|---|
| Step 101 | Start Search |
| Step 102 | Type |
| Step 103 | Select key word |
| Step 104 | Select preconfigured list of data |
| Step 105 | Results |
| Step 106 | View list of entries (locations) in the memory each of which includes the keyword |
| Step 107 | Select desired entry to view detailed information for that entry. |

Thus in step 101 the network supervisor starts a search. At step 102 the network supervisor selects whether to search using either keywords in step 103 or a preconfigured list of data in step 104. The preconfigured list of data may include, for example, commonly used data which the network supervisor might want to refer to frequently.

The step 103 corresponds to the column 5 of FIG. 2.

After the relevant keyword has been entered in step 103, (which in FIG. 2 is "dhcp") if the results are found in step 105, then in step 106 a list is presented of entries (locations) in the memory each of which includes the keyword. The list in step 106 corresponds to column 6 in FIG. 2. The network supervisor then, in step 107, selects the relevant entry (i.e. in the column 6 of FIG. 2) to obtain the detailed information for that entry.

If, however, in step 105 no results are found as a result of the keyword search in 103 or the list of preconfigured data in step 104, then one returns to step 101 and starts a new search.

It will thus be seen that queries can be performed using either keywords or preconfigured data.

Keywords can be indexed to enhance performance. Thus, during development, groups of keywords can be selected to make them more easily searchable. Also, one can include synonyms for these keywords to enhance user-interaction. And since these keywords are basically features which are supported on the device, one only needs to index them once so that each keyword is linked to its respective branch.

Data can be searched on the fly by keywords or cached and sorted once configured, i.e., one generates a sorted list of keywords every time these configurations change (to have more efficient access-time when we perform search queries, but one has to regenerate this list every time we change any of those settings).

The preconfigured data comprises a set of features that users may utilize to operate devices.

Figure 5:
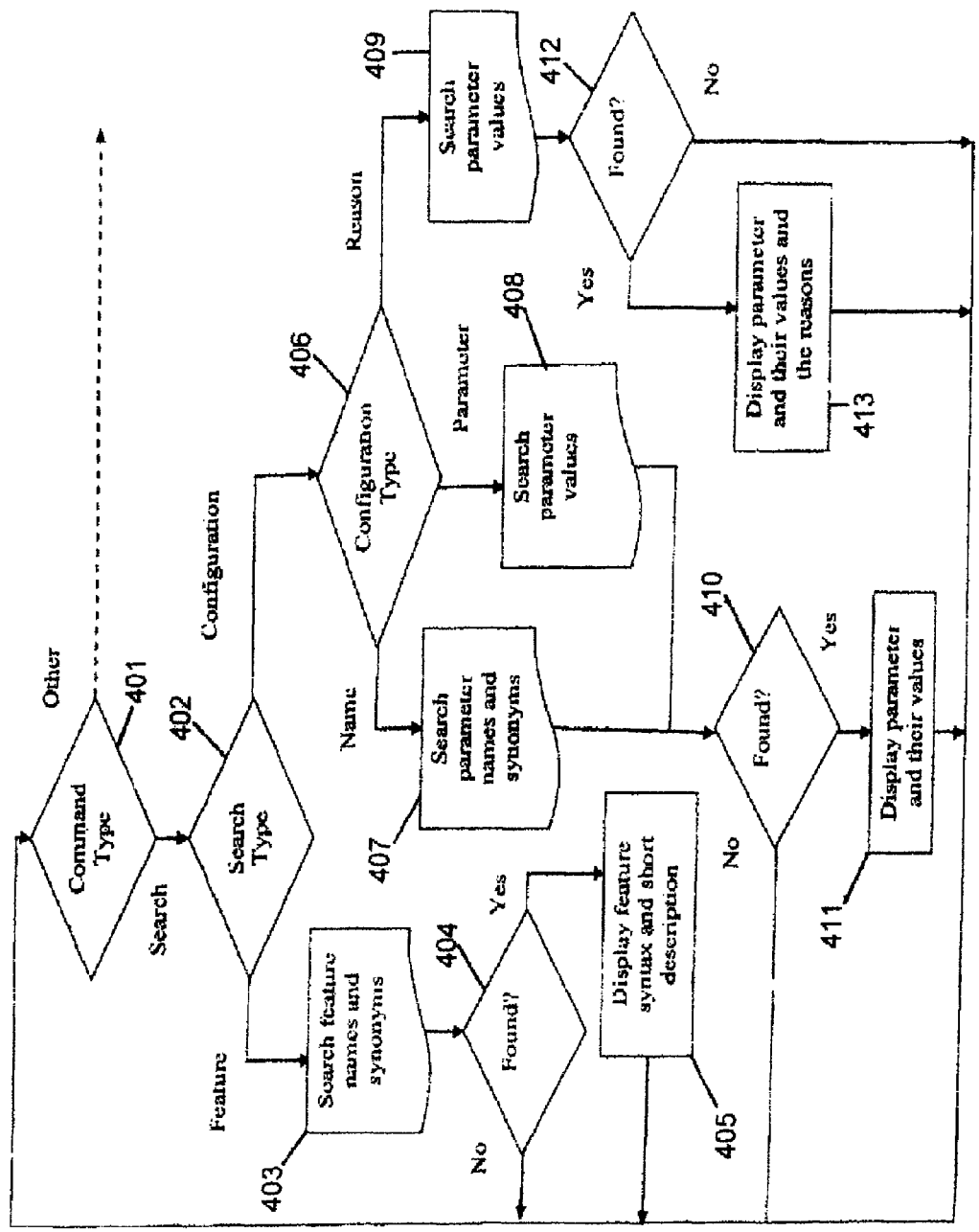
FIG. 5 is a flow chart of the steps of an alternative method according to the invention.

FIG. 5 shows an alternative set of steps for carrying out the invention.

| | |
|---|---|
| Step 401 | Command Type (select what command is to be used, in this case "search"). |
| Step 402 | Type of Search? If "Feature" go to step 403, if "Configuration" go to step 406 (at this point the network supervisor can select to search for a particular feature in the device, or a particular configuration on the device) |
| Step 403 | Search Feature Names & Synonyms |
| Step 404 | Was Feature Name or Synonym Found? If "Yes" go to step 405; if "No" return to step 401 |
| Step 405 | Display the Feature Syntax & Short Description and return to step 401 |
| Step 406 | Select Type of Configuration. If "Name" go to step 407; if "Reason" go to step 409; if "Parameter" go to step 408 (either "Name" or "Reason") |
| Step 407 | Search for Parameter Names & Synonyms |
| Step 408 | Search for Parameter Values |
| Step 410 | Was anything found in step 407 or 408? If "No" return to step 401; if "Yes" display the parameter and their values at step 411, then return to step 401 |
| Step 409 | Search for parameter Values |
| Step 412 | Were Parameter Values found in step 409? If "Yes" go to step 413; if "No" return to step 401 |
| Step 413 | Display Parameter and their values and the reasons then return to step 401 |

It will be noted in the arrangement of FIG. 5, in addition to the steps which can be carried out in FIG. 4, one can search the configuration of a particular device, using a search parameter in terms of a name and synonym in step 407, or one can search for the values of a parameter by the actual parameter values so that inserting a particular value of the parameter will produce a list of all those parts of the device which carry that parameter value in step 408, and in step 409 one can actually search for the reasons that a particular parameter has a particular value. This is particularly useful since in the setting up of the device, a previous network supervisor may have set a parameter at a particular value for a particular reason, and he can insert that reason into the memory of the device so that a subsequent person looking at that particular parameter value will know why that particular parameter value has been set.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for accessing information from a device, said device to be managed through a command line interface at a terminal that is to be networked to the device, said method comprising:

storing information regarding operation of the device in a hierarchical structure in a memory within the device, wherein said hierarchical structure comprises a plurality of layers;

receiving a search command in the device; and receiving a command relating to a management feature name or a configuration of the device, wherein the device is to search through the hierarchical data structure for the management feature name or configuration of the device, and wherein the search command is provided in a first layer of the hierarchical structure and the management feature name or configuration is provided in a second layer of the hierarchical structure.

2. The method as claimed in claim 1, wherein the device provides the terminal with a list of the commands that use the management feature name, said device storing data relating to all of the management features in a third layer of the hierarchical structure in the memory.

3. The method as claimed in claim 2, wherein the third layer includes, for each feature, the associated commands that use that management feature name, a short description of each of the commands, and a list of similar terms.

4. The method of claim 3 including displaying the feature, commands and short description.

5. The method of claim 1, further comprising:

searching for commands that use a particular parameter by further receiving a parameter to the device after receiving the search command relating to the configuration, wherein the device is configured to search for all the commands that have the relevant parameter and to display a list of commands that have the parameter.

6. A method as claimed in claim 5, wherein the memory includes a field associated with each parameter including information as to why a parameter was set to a particular value, wherein the device is configured to display information as to why each command parameter was set to a particular value.

7. A method as claimed in claim 6 including providing said set of entries in a readable format.

8. A method as claimed in claim 7 including providing said set of entries in a readable format with a brief description of the subject stored at each entry.

9. A method as claimed in claim 6, wherein the command relating to the management feature name or configuration comprises a keyword, said method further comprising:

storing said information in a branch structure wherein, before said keyword is received, a set of entries of first-branch subjects stored in the memory is to be displayed on the terminal and a selection of one of said first-branch subjects is received before said keyword is received.

10. A device to be implemented in a network, said device to be connected to a terminal through the network and managed through a command line interface at the terminal, said device comprising:

a memory including a hierarchical structure storing information regarding operation of the device, wherein said hierarchical structure comprises a plurality of layers, wherein the memory is accessible from the command line interface at the terminal for a command line management feature or configuration of the device, wherein search commands from the command line interface include at least one keyword relating to a subject regarding operation of the device to be searched, and wherein the search commands are provided in a first layer of the hierarchical structure and the management feature or configuration of the device is provided in a second layer of the hierarchical structure;

wherein the memory is to be accessed when the at least one keyword is received from the command line interface; and wherein the device is to communicate, from the memory, a set of entries which each contain information including the at least one keyword to the terminal.

11. A device as claimed in claim 10, wherein the device is further to communicate instructions to display said set of entries in a readable format on the terminal.

12. A device as claimed in claim 11, wherein the instructions include a brief description of the subject stored at each entry.

13. A device as claimed in claim 12, wherein the brief description of the subject stored at each entry further includes a value of a parameter and a reason why the parameter was set to that value.

14. A device as claimed in claim 10, wherein the memory is further to store the information in a branch structure, wherein, before said keyword is received, a set of entries of first-branch subjects stored in the memory is to be displayed on the terminal and a selection of one of said first-branch subjects is to be received.

15. A network device, said device to be connected to a terminal through a network and to be managed through a command line interface at the terminal, said device comprising:
a memory storing information regarding operation of the device in a hierarchical structure, wherein said hierarchical structure comprises a plurality of layers;
means for receiving a search command for a command line management feature or configuration of the device, said means for receiving also being configured to receive a command relating to a management feature name or configuration of the device from the terminal; and
means for searching for the command line management feature or configuration in the memory based upon receipt of the search command and the command relating to the management feature name or configuration, wherein the means for searching is further to search through the hierarchical data structure for the management feature name or configuration, and wherein the search command is provided in a first layer of the hierarchical structure and the management feature name or configuration is provided in a second layer of the hierarchical structure.

16. The network device as claimed in claim 15, wherein the device includes means for providing, as a result of the receipt of the search command, a list of the commands that use the management feature name to the terminal, said device further storing data relating to all of the management features in a third layer of the hierarchical structure in the memory.

17. The network device as claimed in claim 16, wherein the third layer includes, for each feature, the associated commands that use that management feature name, a short description of each of the commands, and a list similar terms.

18. The network device of claim 17 including means for displaying the feature, commands and short description in said list.

19. The network device of claim 15, further comprising:
means for searching for commands that use a particular parameter by further receiving a command after the command relating to the configuration has been received, wherein the means for searching is to search for the commands that have the particular parameter and to provide a list of commands that have the particular parameter.

20. A network device as claimed in claim 19, wherein the memory includes a field associated with each parameter including information as to why a parameter was set to a particular value, wherein the device is to display information as to why each command parameter was set to a particular value.

* * * * *